May 12, 1970     A. C. CHRISTY     3,510,949
MAGNETIC GEOMETRIC PATTERN-PRODUCING DEVICE AND TOY
Filed Dec. 23, 1968     2 Sheets-Sheet 1
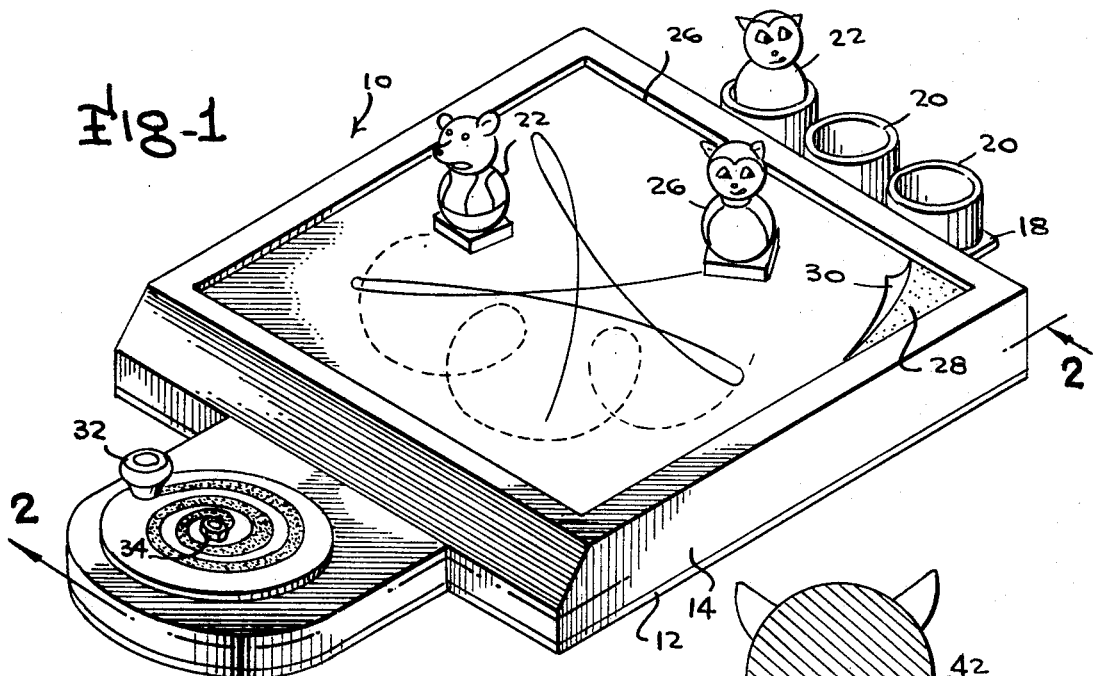
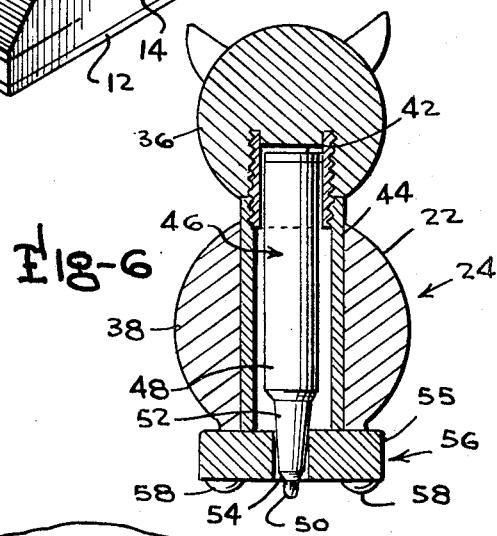
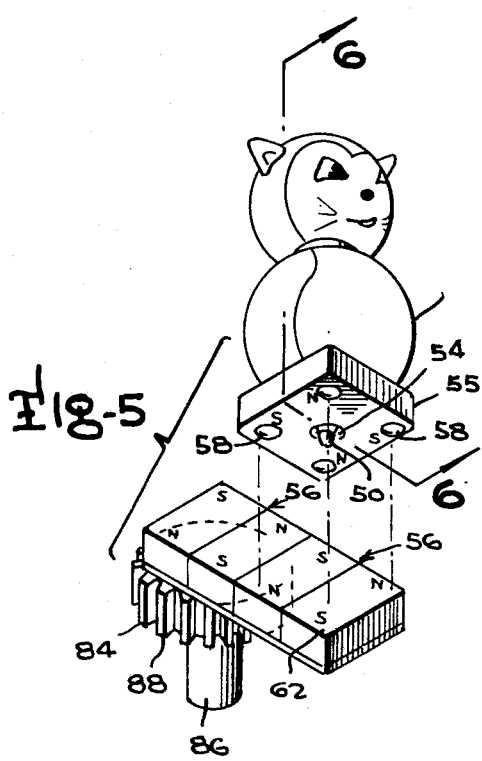
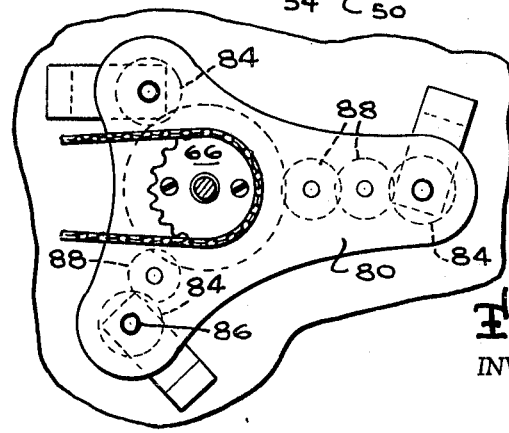
INVENTOR
ALEXANDER C. CHRISTY
BY Mason, Fenwick & Lawrence
ATTORNEYS

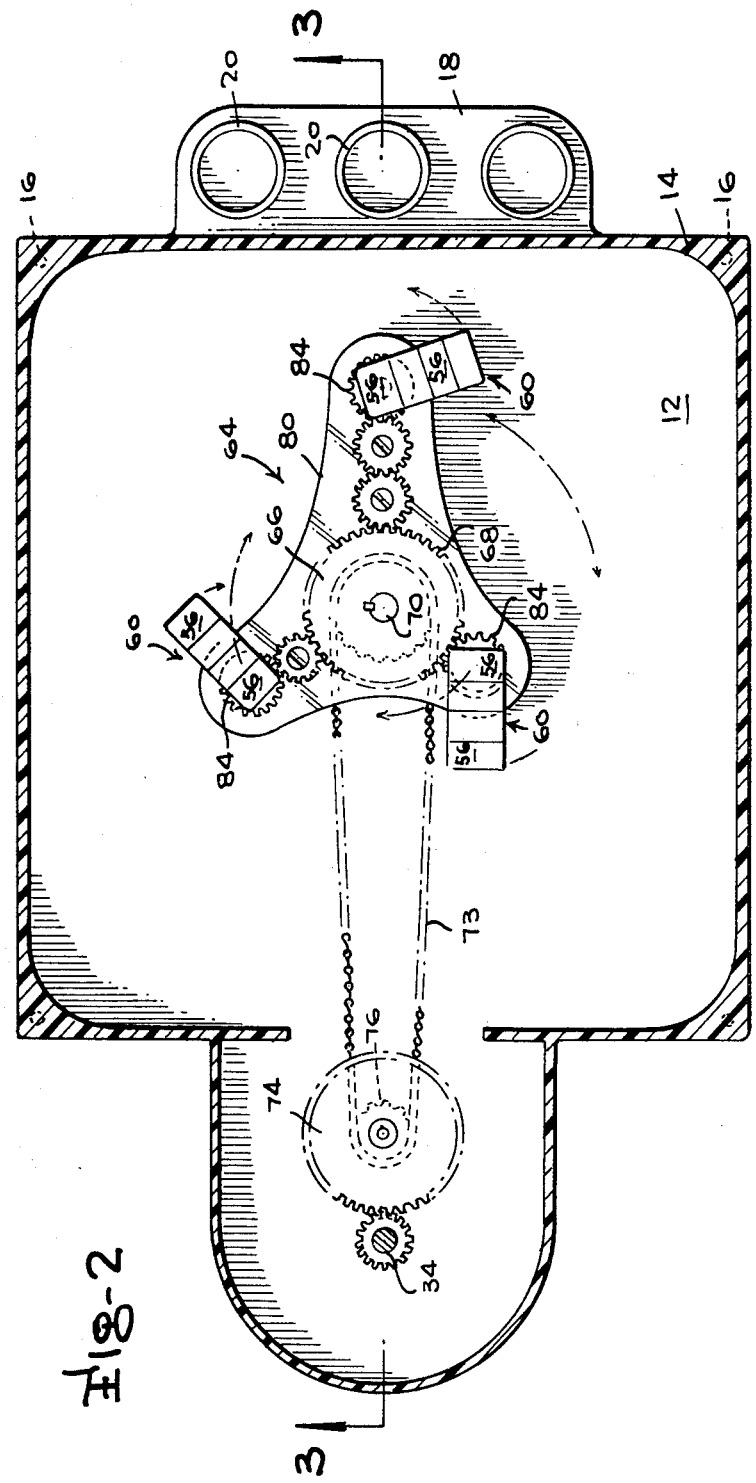

United States Patent Office 3,510,949
Patented May 12, 1970

3,510,949
MAGNETIC GEOMETRIC PATTERN-PRODUCING DEVICE AND TOY
Alexander C. Christy, P.O. Box 1185,
Morgantown, W. Va. 26502
Filed Dec. 23, 1968, Ser. No. 786,109
Int. Cl. B43i 11/00
U.S. Cl. 33—27                                                14 Claims

ABSTRACT OF THE DISCLOSURE

An amusement device for graphically producing geometric patterns comprising: a plurality of driving quadripole magnets each having a horizontal magnetic axis parallel to a surface and positioned immediately below said surface to magnetically drive an inscribing means, the driving magnets being positioned to revolve about a first axis perpendicular to said surface and formed into a sun gear, each said driving magnet secured for rotation to a rotatable second axis parallel to said first axis and forming planet gears, each said second axis being spaced from said first axis as by idler gears to provide varying orbits, revolving drive means operably connected to each said second axis for rotation of said second axis and simultaneous revolving of said second axis about said first axis, activating means in the form of a handle remote from said first axis to operatively control said revolving drive means, whereby said inscribing means and graphic means is magnetically driven by registry of its quadripole magnet with the driving quadriploe magnet producing a graphic geometric pattern on an image receiving surface upon movement of said activating means.

---

This invention relates to an amusement device and an apparatus for producing and reproducing selected geometric patterns. More particularly, the present invention relates to an apparatus and amusement device for magnetically producing and reproducing replicas of visible geometric patterns on sheet material.

It is the principal object of the present invention to provide a novel apparatus and amusement device wherein geometric patterns are graphically produced on sheet material through the operation of a magnetically-controlled inscribing means.

It is also an object of the present invention to produce graphically geometric patterns and identical replicas thereof.

A further object of the present invention is to provide an amusement device for producing geometric patterns graphically wherein the graphic means which may be plural are in the form of doll-like figures which are driven magnetically while inscribing continuous geometric patterns.

A further object of the present invention is the provision of an amusement device for the production of visible geometric patterns graphically produced by an inscribing means which is magnetically driven to produce a plurality of individual identical geometric patterns offset from each other.

This invention also has as a further object the provision of a combination of magnetic driving means and magnetic inscribing means wherein the inscribing means may be positioned in a plurality of positions with respect to any one driving means with each different position producing a different geometric pattern.

A further object of the present invention is the incorporation of quadripole magnets for both the driving means and the inscribing means whereby the incscribing means is magnetically held securely to the driving means at each of four registering magnetic poles whereby the inscribing is held from disengagement from the driving means during the inscribing of the geometric pattern.

Further and more specific object of the present invention is to provide a magnetically motivated inscribing means provided with a dye or ink-carrying applicator for visibly inscribing geometric patterns upon sheet material.

Another and more specific object of the present invention is the provision of a sun and planetary gear arrangement operating the driving quadripole magnets wherein the number of gear teeth in the sun and planet gears are preselected to permit the maximum number of non-coincident geometric patterns.

These objects, as well as others, will become readily apparent upon a careful consideration and persual of the application including the specification and claims and the drawings, in which FIG. 1 is a perspective view of the present invention illustrating exemplary geometric patterns produced simultaneously by inscribing means in the form of a plurality of doll-like figures.

FIG. 2 is a cross-sectional view along lines 2—2 of FIG. 1 and illustrating the planetary and sun gear arrangement and the eccentric positioning of the driving quadripole magnets.

FIG. 3 is a cross-sectional view taken along the lines 3—3 of FIG. 2 and illustrating the positioning of the inscribing means upon the nonmagnetic image-receiving means and the image-retaining surface.

FIG. 4 is a cross-sectional view taken along the lines 4—4 of FIG. 3 and partly broken away illustrating the underside of the planetary gear arrangement for operating the driving quadripole magnets.

FIG. 5 is an exploded perspective view of the inscribing means in the form of a doll illustrating the graphic means in combination with the quadripole magnet and the positioning of the inscribing means relative to the driving quadripole magnet.

FIG. 6 is a cross-sectional view taken along lines 6—6 of FIG. 5 illustrating the graphic means positioned within the inscribing means having the form of a doll-like figure and illustrating the point of the contact of the applicator of the graphic means onto the sheet material forming the image-retaining surface.

With reference to FIG. 1, the numeral 10 refers to the apparatus and amusement device of the present invention. As best shown in FIGS. 2 and 3, the device 10 includes a platform or base 12 and a suitable cover or top portion 14. The base 12 and top 14 may be formed from any suitable plastic such as the ABS, polystyrene, polyvinyl chloride, etc., being important only that it have adequate strength to support the sheet material and, importantly, is not magnetic.

The shape of the platform and cover is not particularly important although in the form found preferable, the cover and the platform are of the same silhouette in plan view and are secured by any suitable means such as screws 16. Secured to one end of the cover 14 and protruding from the side thereof is shelf 18 supporting a plurality of figure-holding receptacles 20 shaped to acommodate the figures 22 which house and form the inscribing means 24.

The top 24 is provided with a recess 26 and a floor 28 providing a support for the image receiving means in the form of sheet material 30. The cover 14 is also provided with a suitable handle or crank constituting an activating means which imparts rotation to axis 34.

The sheet material 30 may preferably be any smooth cellulose product such as paper which will retain an image upon application of any graphic ink or dye means. Particularly desirable is the coated or calendered paper having a glossy surface which possesses a substantially frictionless image-receiving surface.

The figure 22 is provided with any desirable outside configuration in the form of a doll, bear, etc., and is further provided with a head and body portion 36 and 38 respectively, as best shown in FIG. 6. For convenience, the head and body are connected by suitable screw threads 40 provided in complementary tubular head member 42, and body tube 44. The tube 44 receives a graphic means 46 which may be of any conventional ink or dye-carrying container and dispensing portion 48, and a suitable conventional applicator point 50 which may be of felt, nylon, or ball point conventional construction. The graphic means adjacent the applicator point 50 is narrowed as it fits the tube to be received within the opening 54 in the magnet base 55 of the inscribing means, all as best seen in FIG. 6. At the under portion of the magnet base are friction-reducing projections 58 which permit the figure to glide more easily along the paper 30 recording the image. In the preferred form of the invention, the opening 54 and the narrowing of the ink or dye carrier 48 is such that the applicator point 50 protrudes slightly below the lowest point of the friction-reducing projections 58 such that the weight of the graphic means 46 will be applied to the paper 30.

The magnet base 55 of the figure 22 forming the inscribing means 24 is a quadripole magnet 56 having adjacent dissimilar poles as may be best seen from FIG. 5.

In order to motivate the figures 22 and therefore move the inscribing means 24 about the paper 30 to impart any particular geometric pattern as typically shown in FIG. 1, there is provided below the floor 28 of the cover a unique arrangement of rotating and revolving plural quadripole magnets each identical to the single quadripole magnet 56 forming the magnet base 55 of the inscribing means 24.

As best shown in FIG. 2 and FIG. 5, and in the preferred embodiment, the driving magnets include adjacent and contiguous pairs of quadripole magnets 56 wherein the adjacent poles are dissimilar. The entire drive magnet 60 may be covered by antifriction coating 62 which may be any suitable resinous material such as a vinyl resin as to permit the drive magnets to slide freely in contact with the under surface of the floor 28 as shown in FIG. 3, and thereby be as close to the magnet base 55 as possible.

The preferable use of the dual or double quadripole magnets performing the drive magnet 60 provides a twofold advantage.

First, and most important, there are a greater number of positions on the drive magnet into which the magnet base 55 inscribing means may come under the magnetic influence of the drive magnet and be held securely. There are eight reinforcing points for holding the magnet base of the inscribing means to the drive magnet 60. The eight points, of course, are the four respective north and south poles in each of the quadripole magnets of the magnet base 55 and the drive magnet 60 which coincide in any particular position of the inscribing means over the drive magnet. With such greater initial adhering positions and the continuous strength of contact, there is far less likelihood of the loss or breakdown of the magnetic influence between the drive magnet 60 and the magnet base 55 of the inscribing means 24. Another salient feature of a quadripole magnetic coupling is to prevent slippage during the peripheral movement of the magnet 55 as it revolves and rotates. The centrifugal force directed to the magnet 55 is greatest at the outer periphery and requires the stabilizing securing force of the quadripole magnet. Dual pole magnets have been found to disengage under the influence of the centrifugal force during peripheral rotation.

Second, it should be clear that when the drive magnets 60 are in position in light contact with the underside of the floor 28 and the paper 30 placed on the topside of the floor that the magnet 55 of the inscribing means 24 will fit in a number of positions under the influence of the drive magnet 60. For instance, there are six positions that the inscribing means magnet 55 may assume under the magnetic influence of the drive magnet 60 and, in each, the figure 22 will not be either positioned or facing as in any of the other five positions. The graphic means, being centrally located, can assume only three different positions with respect to the drive magnets. However, each different position will produce a different geometric pattern upon movement of the drive magnet.

It is also possible for any figure to carry two or more graphic means 46 which may, for instance, be of different colors such that each separate means will inscribe its individual color and different geometric pattern on the paper 30. With plural graphic means in any particular figure, any change in position of the figure with respect to the same drive magnet below will amount to a change in the geometric pattern produced. In such case, there will be six different positions for the figure having multiple graphic means, each position producing a slightly different geometric figure or different color than the adjacent geometric figure.

The mechanism for moving the drive magnets 60 below the platform 28 is in its preferred form a planetary gear arrangement shown generally at 64. The planetary gear mechanism includes a sun gear 66 preferably provided with an odd number of gear teeth 68, for instance 51. The sun gear 66 is mounted and keyed to shaft 70 forming a first axis of rotation. The shaft 70 is suitably mounted and fixed to platform 12. Mounted for rotation about the shaft 70 is a suitable gear 72 driven by chain 73 which in turn is suitably driven by suitable reduction gears 74 and 76 that mesh with gear 78 mounted on the axis 34 operated by the handle or crank 32.

The gear 72, mounted for rotation about the axis 70, is secured to a revolving gear base 80 by suitable means such as gear-base screws 82. The gear base is received for rotation about the axis 70 and provides a support for the planetary gears 84 which are each mounted for rotation on stub shafts 86 received in suitable openings in the gear base 80. The number of gear teeth 88 in each of the planetary gears 84 determines the number of revolutions made by the planetary gear 84 and, in the preferable form of the invention, the number of teeth is not the same for all planetary gears although it is permissible that they be the same. Essentially, it is desirable only to have the number of planetary gear teeth 88 be even with an odd number of sun gear teeth, or vice versa, and provided that the number of gear teeth in the planetary gears are not a sub-multiple of the number of gear teeth in the sun gear. It has been found that the three planetary gears may have 12, 12 and 16 gear teeth respectively. Obviously, the fewer the teeth the faster the rotation of the drive magnet.

The planetary gears 84 are connected to the sun gear at different distances from the sun gear in accordance with the number of idler gears 88 as shown for exemplary reasons only. One of the planetary gears has no idler gear; the other has a single idler gear; and the third, two idler gears, in order to space the planetary gears 84 at desired intervals for different orbits about the sun gear. It should be understood that the use of idler gears is not essential. However, it is desirable and preferable in view of the fact that it increases the number of different geometric patterns that may be produced.

The drive magnets 60 are eccentrically mounted for rotation with their respective planetary gear as shown in FIGS. 2 or 4 and more particularly FIG. 5. The manner of securing such drive magnets to the planetary gears is not critical. It may be adhesively held or any other suitable connection provided.

In operation, the amusement device and apparatus of the present invention is simple to operate and merely requires the placing of a sheet of paper 30 on the floor 28 and one or more of the figures placed on top of the paper as shown in FIG. 1. As the handle 32 is rotated, motion is transmitted through the reduction gears 74, 76 and 78, and through chain 73 to gear 72 which, in turn, being secured to the gear base 80 rotates the base 80 and the planetary gears 84 about the sun gear 66. The planetary gears 84 not only revolve about the sun gear 66, but rotate about their respective axes provided by stub shafts 86 received in the gear base 80, each planetary gear 84 rotating in a different concentric orbit about the sun gear 66. The eccentric position of the drive magnet 60 and the revolving and rotating motion produced, sweeps the drive magnets along the underside of the floor 28 until one of the drive magnets approaches one of the stationary figures 22 previously placed upon the paper 30. At this time the dual quadripole magnets forming the drive magnets 60, engage and force the quadripole magnet base 55 to assume a position under magnetic influence wherein the four poles of the quadripole drive magnet 56 and the four poles of the quadripole magnet of the figure 22 will coincide forming a strong magnetic bond between the drive magnet and the figure. Of course, it is possible that the magnet base 55 is initially placed directly into position above the drive magnet.

Continued cranking motion and the rotation of the drive magnet as well as revolving motion about the sun gear will produce this identical motion in the figure having the inscribing means 24 provided therein in the form of graphic means 46 and applicator 50. The point 50 will track a visible geometric pattern on the paper 30 in accordance to which position the figure takes of the various possible positions on any one particular double quadripole magnet of the drive magnet and also which of the plural drive magnets that first came into proximity to the magnet base 55 to cast its magnetic influence upon the magnet base.

After a number of turns of the crank 32, in accordance with the number of gear teeth in the sun gear and the planetary gear, the inscribing means will finally begin to track the identical path. Until this time, each inscribing means will generate a plurality of identical but not coincident geometric patterns, each figure producing its own pattern in accordance with the path for such figure predetermined by the position on one of the respective drive magnets 60. At any time the inscribing means may be raised and the paper 30 removed and replaced. If the figures are placed in the same position as they previously were, an exact duplicate or replica of the geometric patterns will be produced on a clear piece of paper 30 as was produced on the previous sheet.

One of the significant advantages of the present invention is that figures placed on the paper and picked up under the influence of the drive magnets 60 will produce different geometric patterns, and the figures under the influence of different drive magnets will not intersect or collide nor produce identical patterns of the other figure. In view of the numerous positions obtainable on each of the drive magnets and the different orbits for each of the drive magnets, an almost infinite number of geometric patterns are possible.

Various modifications of the invention as above described are possible. For instance, any path or geometric pattern is possible to be achieved simply by varying the gearing and location of the planetary gears and the drive magnets positioned on the planetary gears.

I claim:

1. An amusement device for graphically producing geometric patterns comprising: a nonmagnetic image receiving means having an image retaining surface, an inscribing means including a quadripole magnet having horizontal magnetic axes parallel to said surface for slidable movement along the top of said surface, graphic means carried by said inscribing means for contact with said surface to produce said geometric patterns thereon, a plurality of driving quadripole magnets each having a horizontal magnetic axis parallel to said surface and positioned immediately below said surface to magnetically drive said inscribing means, said driving magnets being positioned to revolve about a first axis perpendicular to said surface, each said driving magnet secured for rotation to a rotatable second axis parallel to said first axis, each said second axis being spaced from said first axis, revolving drive means operably connected to each said second axis for rotation of said second axis and simultaneous revolving of said second axis about said first axis, activating means remote from said first axis to operatively control said revolving drive means, whereby said inscribing means and graphic means is magnetically driven by registry of its quadripole magnet with the driving quadripole magnet producing a graphic geometric pattern on said image receiving surface upon movement of said activating means.

2. The amusement device of claim 1 including said image-retaining surface being removable and disposable sheet material capable of retaining an image produced from said inscribing means.

3. The amusement device of claim 1 including said graphic means being a dye-containing and dispensing means and including applicator means extending from said inscribing means to contact said image retaining surface.

4. The amusement device of claim 1 including each said quadripole mognet having adjacent poles dissimilar.

5. The amusement device of claim 1 including each said driving quadripole magnet having a second quadripole magnet contiguous thereto forming an elongated bar.

6. The amusement device of claim 1 including a friction reducing nonmagnetic coating covering said driving quadripole magnets.

7. The amusement device of claim 1 including each said driving magnet being secured to planetary gears including each said second axis.

8. The amusement device of claim 7 wherein said revolving drive means includes said first axis positioned within a sun gear, said sun gear being operatively connected to cause the rotation of each said planetary gear.

9. The amusement device of claim 1 including each said driving quadripole magnet being eccentrically positioned for rotation about each said second axis.

10. The amusement device of claim 1 wherein said activating means includes a handle means operatively connected to said revolving drive means.

11. The amusement device of claim 5 including each quadripole magnet having adjacent poles dissimilar and each said driving magnet provided with at least three different receiving positions for the quadripole magnet of the inscribing means.

12. The amusement device of claim 1 including said image-retaining surface being a removable and disposable sheet material capable of retaining an image produced from said inscribing means, said graphic means being a dye-containing and dispensing means and including applicator means extending from said inscribing means to contact said image-retaining surface, each said driving quadripole magnet having a second quadripole magnet contiguous thereto forming an elongated bar, each quadripole magnet having adjacent poles dissimilar and each said driving magnet provided with at least three different receiving positions for the quadripole magnet of the inscribing means, each said driving magnet being secured to a planetary gear rotatable about each said second axis of said planetary gear, said revolving drive means including said first axis positioned within a sun gear, said sun gear being operatively connected to cause the rotation of each said planetary gear, each said driving quadripole magnet being eccentrically positioned for rotation about each said second axis, and wherein said activating means includes a handle means operatively connected to said revolving drive means.

13. The amusement device of claim 1 wherein said revolving drive means includes a sun gear embodying said first axis, a planet gear secured to each driving magnet and operatively connected to said sun gear for revolvement around said sun gear, each said planet gear revolving in a different orbit from another planet gear while rotating about said second axis.

14. The amusement device of claim 13 wherein said sun gear includes a preselected number of gear teeth being a nonmultiple compared to the number of gear teeth on said planet gear whereby each said inscribing means magnetically held to and driven by said driving magnets will produce a plurality of identical, non-coincident geometric patterns, and whereby a predetermined geometric pattern is obtained in accordance with a predetermined location of said inscribing means relative to one of said driving magnets.

References Cited

UNITED STATES PATENTS

| 2,471,002 | 5/1949 | Mohr. | |
| 3,103,360 | 9/1963 | Miller et al. | 46—240 |
| 3,114,547 | 12/1963 | Joslyn. | |
| 3,416,231 | 12/1968 | Mercorelli. | |

HARRY N. HAROIAN, Primary Examiner

U.S. Cl. X.R.

40—106.45; 46—239